US012221879B2

(12) United States Patent
Alali et al.

(10) Patent No.: US 12,221,879 B2
(45) Date of Patent: Feb. 11, 2025

(54) METHOD FOR CREATING MULTIPLE DOWNHOLE SMART DOCKING STATIONS FOR ROBOT BATTERY RECHARGING AND DATA TRANSFERRING

(71) Applicant: SAUDI ARABIAN OIL COMPANY, Dhahran (SA)

(72) Inventors: Eyad Ali Alali, Dammam (SA); Mohammed Abdullah Bataweel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 231 days.

(21) Appl. No.: 18/064,640

(22) Filed: Dec. 12, 2022

(65) Prior Publication Data

US 2024/0191618 A1    Jun. 13, 2024

(51) Int. Cl.
*E21B 47/12* (2012.01)
*E21B 23/00* (2006.01)
*E21B 41/00* (2006.01)
*E21B 43/30* (2006.01)
*G01V 11/00* (2006.01)

(52) U.S. Cl.
CPC ............ *E21B 47/12* (2013.01); *E21B 23/001* (2020.05); *E21B 41/0035* (2013.01); *E21B 41/0085* (2013.01); *E21B 43/305* (2013.01); *G01V 11/002* (2013.01)

(58) Field of Classification Search
CPC .... E21B 47/12; E21B 23/001; E21B 41/0035; E21B 41/0085; E21B 43/305; G01V 11/002
See application file for complete search history.

(56) References Cited

U.S. PATENT DOCUMENTS

| 6,953,094 B2 | 10/2005 | Ross |
| 7,131,791 B2* | 11/2006 | Whittaker ............. G01M 3/005 405/184.2 |
| 2011/0011580 A1* | 1/2011 | Clark .................... E21B 33/124 166/66.5 |

FOREIGN PATENT DOCUMENTS

| EP | 0862682 B1 | 12/2005 |
| EP | 2807334 A2 | 12/2014 |
| EP | 2985637 B1 | 8/2018 |
| WO | 2014068581 A2 | 5/2014 |
| WO | 2017088555 A1 | 6/2017 |
| WO | 2020197665 A1 | 10/2020 |

\* cited by examiner

*Primary Examiner* — Dany E Akakpo
(74) *Attorney, Agent, or Firm* — Osha Bergman Watanabe & Burton LLP

(57) ABSTRACT

A method for constructing docking stations for downhole robots is disclosed. The method includes determining locations and respective dimensions along a sidewall of a wellbore for drilling tunnels, constructing, based on the locations and respective dimensions, the tunnels extending from the sidewall of the wellbore, installing a downhole robot docking station in a first where the downhole robot docking station is disposed external to the wellbore, installing a power source in a second tunnel where the power source is disposed external to the wellbore, and connecting the downhole robot docking station and the power source via an electrical connection disposed along at least the sidewall of the wellbore.

20 Claims, 5 Drawing Sheets

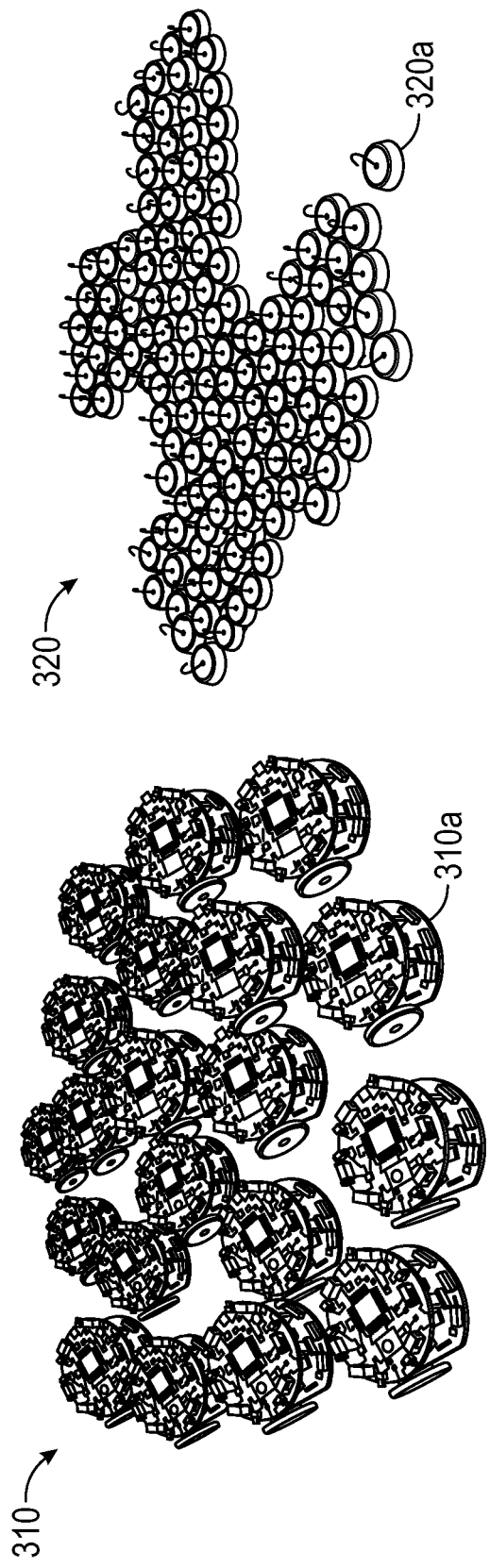
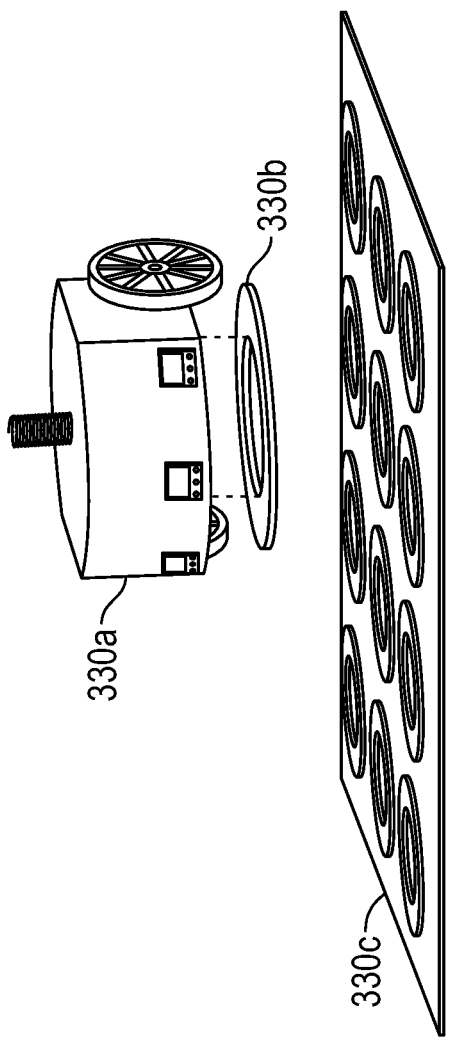
FIG. 3A
FIG. 3B

METHOD FOR CREATING MULTIPLE DOWNHOLE SMART DOCKING STATIONS FOR ROBOT BATTERY RECHARGING AND DATA TRANSFERRING

BACKGROUND

Wells in oil and gas fields are drilled in vertical or horizontal directions. Downhole completions have restricted access (e.g., one-way only) and limited space for prolong devices installations. Development of downhole robots, generally referred to as robots throughout this disclosure, is an active research area to perform many routine tasks such as wellbore investigation, downhole data acquisition, tubing inspections for scale and corrosion, etc.

SUMMARY

In general, in one aspect, the invention relates to a method for constructing docking stations for downhole robots. The method includes determining a plurality of locations and respective dimensions along a sidewall of a wellbore for drilling a plurality of tunnels, constructing, based on the plurality of locations and respective dimensions, the plurality of tunnels extending from the sidewall of the wellbore, installing a downhole robot docking station in a first tunnel of the plurality of tunnels, wherein the downhole robot docking station is disposed external to the wellbore, installing a power source in a second tunnel of the plurality of tunnels, wherein the power source is disposed external to the wellbore, and connecting the downhole robot docking station and the power source via an electrical connection disposed along at least the sidewall of the wellbore.

In general, in one aspect, the invention relates to a wellbore. The wellbore includes a plurality of tunnels extending from a sidewall of the wellbore, a downhole robot docking station installed in a first tunnel of the plurality of tunnels, wherein the downhole robot docking station is disposed external to the wellbore, a power source installed in a second tunnel of the plurality of tunnels, wherein the power source is disposed external to the wellbore, and an electrical connection disposed along at least the sidewall of the wellbore that connects the downhole robot docking station and the power source.

In general, in one aspect, the invention relates to a system. The system includes a wellbore, one or more downhole robots deployed in the wellbore to perform a pre-determined task, a plurality of tunnels extending from a sidewall of the wellbore, a downhole robot docking station installed in a first tunnel of the plurality of tunnels, wherein the downhole robot docking station is disposed external to the wellbore, a power source installed in a second tunnel of the plurality of tunnels, wherein the power source is disposed external to the wellbore, and an electrical connection disposed along at least the sidewall of the wellbore that connects the downhole robot docking station and the power source, wherein the downhole robot docking station is configured to provide parking, charging, and data communication for the one or more downhole robots.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A and 3B show an example in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method and a system to create multiple downhole smart docking stations in dedicated compartments for downhole robots. The compartments are constructed using controlled radial drilling and/or reservoir tunneling techniques and linked to the main wellbore. The stations can be linked to/or equipped with rechargeable batteries and energy harvesting systems. The dimensions, distribution and specifications for the smart docking stations are defined based on the design and application of the robots. Multiple tunnels may be drilled to accommodate the smart docking stations, rechargeable batteries, and energy harvesting systems. The new downhole smart docking stations are used to provide robots with resting/parking spaces and charging stations, and allow for transferring data and commands if linked to the Earth surface using any suitable wire or wireless means.

Figure 1A:
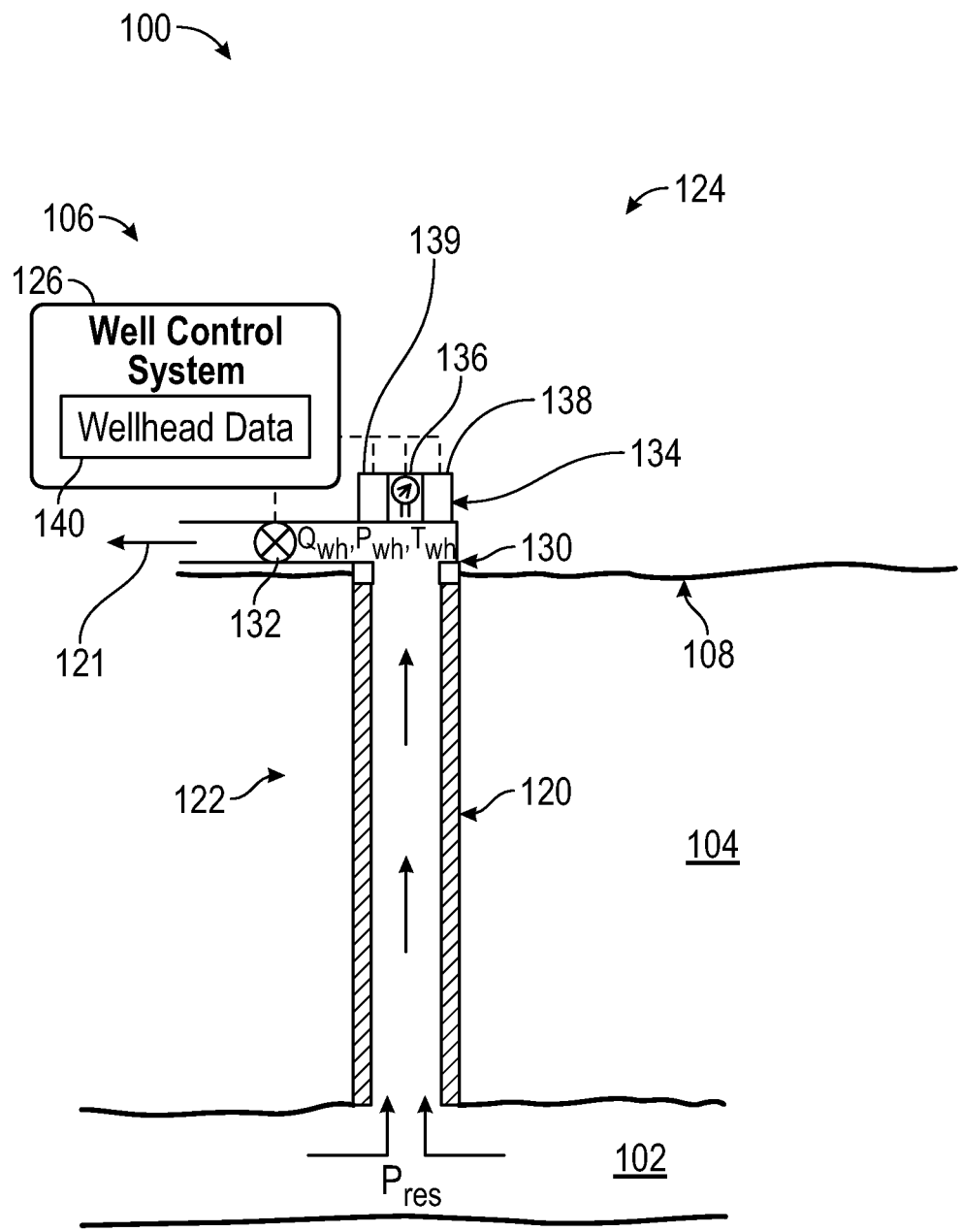
FIGS. 1A, 1B, 1C, and 1D show systems in accordance with one or more embodiments.

FIG. 1A shows a schematic diagram in accordance with one or more embodiments. More specifically, FIG. 1A illustrates a well environment (100) that includes a hydrocarbon reservoir ("reservoir") (102) located in a subsurface formation ("formation") (104) and a well system (106). The formation (104) may include a porous formation that resides underground, beneath the Earth's surface ("surface") (108). In the case of the well system (106) being a hydrocarbon well, the reservoir (102) may include a portion of the formation (104). The formation (104) and the reservoir (102) may include different layers (referred to as subterranean intervals or geological intervals) of rock having varying characteristics, such as varying degrees of permeability, porosity, capillary pressure, and resistivity. In other words, a subterranean interval is a layer of rock having consistent permeability, porosity, capillary pressure, resistivity, and/or other characteristics. For example, the reservoir (102) may be an unconventional reservoir or tight reservoir. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (400) described below in FIG. 4 and the accompanying description.

The wellbore (120) may include a bored hole that extends from the surface (108) into a target zone (i.e., a subterranean interval) of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the formation (104) or the reservoir (102) during injection operations, or the communication of monitoring devices (e.g., logging tools) into the formation (104) or the reservoir (102) during monitoring operations (e.g., during in situ logging operations). For example, the logging tools may include logging-while-drilling tool or logging-while-tripping tool for obtaining downhole logs.

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes, or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In embodiments having a casing, the casing defines a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures (called "wellhead casing hanger" for casing and "tubing hanger" for production tubing) for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1A, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flowrate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flowrate sensor (139) operable to sense the flowrate of production (121) flowing through the well surface system (124), after it exits the wellbore (120). The flowrate sensor (139) may include hardware that senses a flowrate of production (121) ($Q_{wh}$) passing through the wellhead (130).

Throughout the service life of the wellbore (120), various downhole equipment and other elements are serviced and/or maintained from time to time. The maintenance services include, but not limited to, wellbore investigation, downhole data acquisition, tubing inspections for scale and corrosion, etc. In one or more embodiments, downhole robots are deployed into the wellbore (120) to facilitate performing these maintenance services. While a single production well is depicted in FIG. 1A, multiple wells may exist in the formation (104) to access the reservoir (102) or other similar reservoirs in neighboring region(s).

Figure 1B:
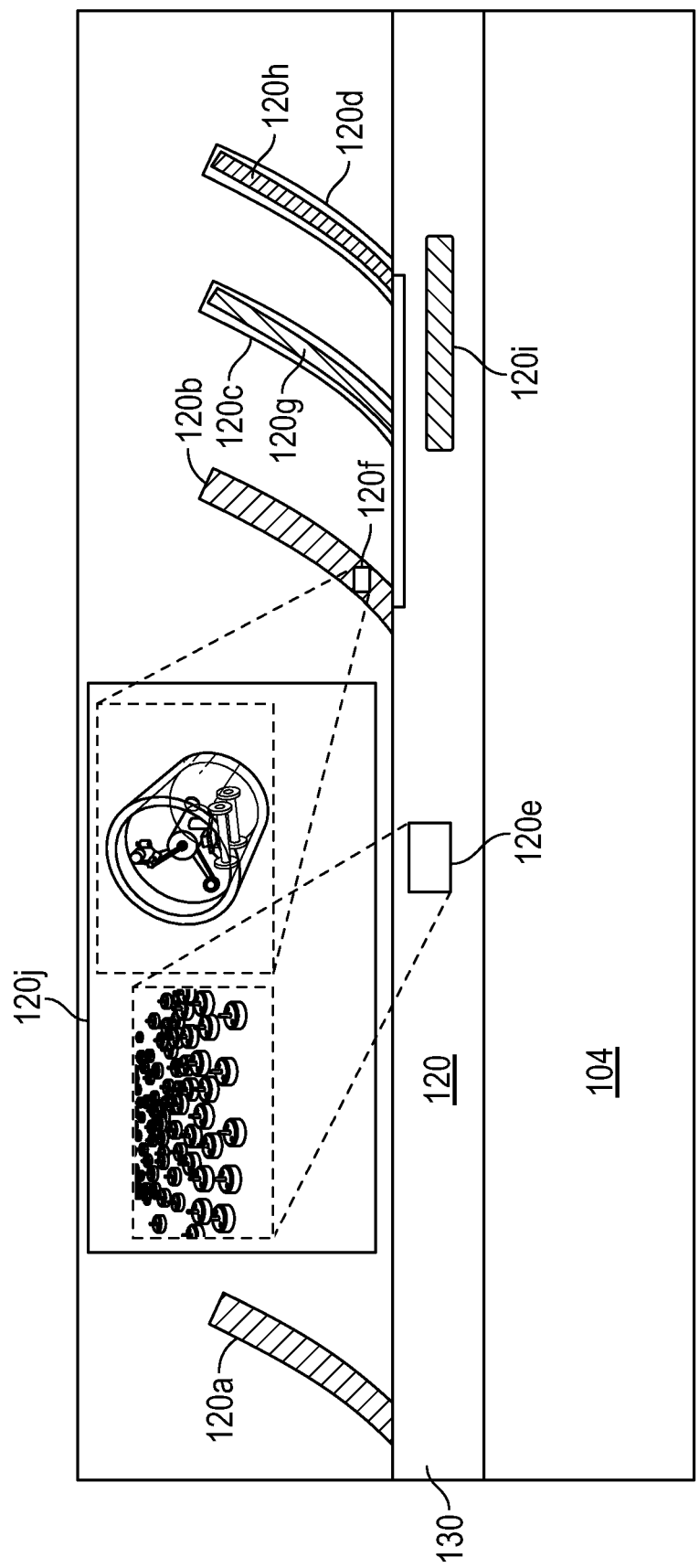

Turning to FIG. 1B, FIG. 1B shows a schematic diagram in accordance with one or more embodiments. Specifically, FIG. 1B illustrates downhole robot support structures associated with the wellbore (120) depicted in FIG. 1A above. In one or more embodiments, one or more of the modules and/or elements shown in FIG. 1B may be omitted, repeated, and/or substituted. Accordingly, embodiments of the invention should not be considered limited to the specific arrangements of modules and/or elements shown in FIG. 1B.

As shown in FIG. 1B, downhole robots (e.g., a swarm of downhole robots (120e) as illustrated in the magnified views (120j)) are deployed into the wellbore (120) to perform various routine tasks such as wellbore investigation, downhole data acquisition, tubing inspections for scale and corrosion, etc. Within the swarm of downhole robots (120e), individual robots cooperatively perform the tasks as one systematic group. These downhole robots move back and forth (i.e., rove) in the single tubing space within the wellbore (120) where tunnels (120a, 120b, 120c, 120d) are constructed to provide spaces for the downhole robots to park, recharge, and transmit/receive information. The tunnels (120a, 120b, 120c, 120d) extend from the sidewall of the wellbore (120) longitudinally (i.e., along the trajectory of the wellbore) toward the opposite direction of the wellhead (130) and laterally away from the wellbore (120). Accordingly, the constructed spaces are external to the wellbore (120) such that full wellbore access and fluid path are not restricted by the roving downhole robots. In this context, the tunnels (120a, 120b, 120c, 120d) are referred to as external tunnels. For example, the tunnel A (120a) and tunnel B (120b) allow the downhole robots to park and standby. In particular, the tunnel B (120b) is installed with a downhole robot docking station (120f) as illustrated in the magnified views (120j). The term "docking" refers to the act of connecting via wired and/or wireless media to park, recharge, and/or perform data communications. The inside shape of the docking station may be designed based on the specific dimensions of a robot or to accommodate many small swarm robots. For example, the docking station is shown as having a cylindrical shape in FIG. 1B to host a ball-shaped or cylindrical-shaped robot. However, those skilled in the art will appreciate that the docking station could take any shape or form to suit the design of the robot. The tunnel C (120c) is installed with an energy harvesting device (120g), referred to as the type 1 energy harvesting device, such as a thermoelectric energy harvesting device. Another energy harvesting device (120i) is installed in the wellbore (120), referred to as the type 2 energy harvesting device, such as a mechanical energy (e.g., fluid flow) harvesting device. The tunnel D (120d) is installed with a rechargeable battery (120h). For example, the rechargeable battery (120h) may supply electrical power to the docking station (10f) where a robot may park and be charged. In turn, the energy harvesting device (120g) and/or the energy harvesting device (120i) may supply electrical power to replenish the rechargeable battery (120h). Additional configuration details of the docking station, energy harvesting device, and rechargeable battery are described below.

Although FIG. 1B is shown as having four tunnels (120a, 120b, 120c, 120d), in one or more embodiments of the invention, more or fewer tunnels may exist along the wellbore (120). Furthermore, the functions of each tunnel described above may be split across tunnels or combined in a single tunnel. Further still, each tunnel (120a, 120b, 120c, 120d) may be utilized multiple times to carry out an iterative operation. For example, two or more of the docking station, energy harvesting device, and rechargeable battery may co-exist in any one of the tunnels (120a, 120b, 120c, 120d) and used by different downhole robots during different time periods.

Figure 1C:
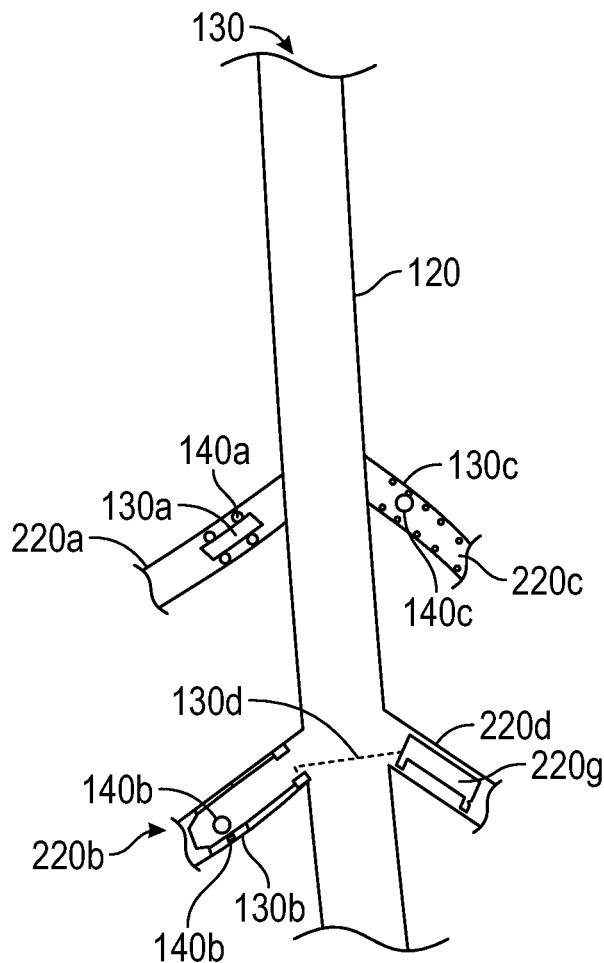

Turning to FIG. 1C, FIG. 1C shows an example scenario of a vertical wellbore (120) where each of the tunnels (220a, 220b, 220c, 220d) may correspond to one of the tunnels (120a, 120b, 120c, 120d) depicted in FIG. 1B above. For example, a robot A (140a) is parked and in standby at the docking station A (130a) installed in the tunnel A' (220a), a robot B (140b) is parked and being recharged using a charging device (140b) at the docking station B (130b) installed in the tunnel B' (220b), a robot C' (140c) is parked at the docking stations C (130c) that is one among a number of docking stations installed in the tunnel C' (220c), and a energy harvesting device (220g) is installed in the tunnel D' (220d) to supply electrical power to the charging device (140b) via an electrical connection (130d).

As shown in FIG. 1C, the robot A (140a) is a larger robot that may have moving parts such as rollers and wheels to enter the inside of the docking station to rest in multiple depths along the wellbore depending on where the tunnels are. In contrast, the the robot B (140b) and robot C (140c) represent small swarm robots.

Figure 1D:
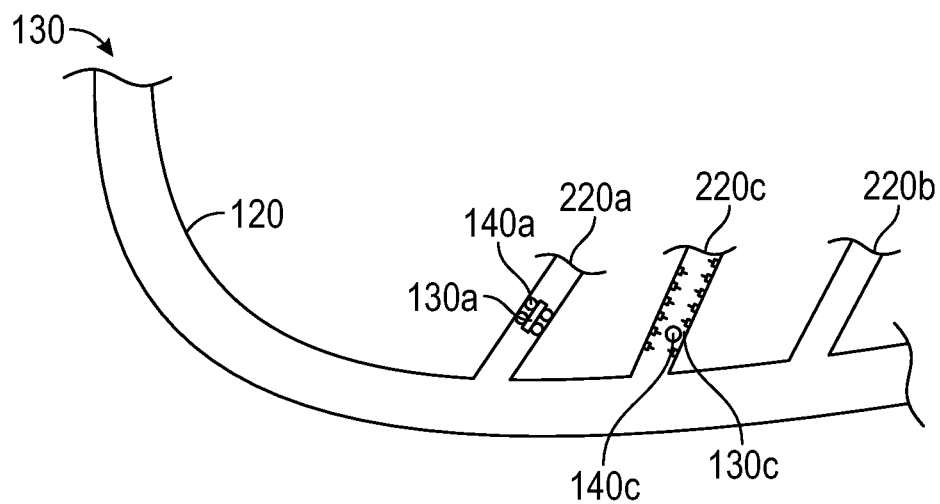

The example of FIG. 1C is shown in a deviated wellbore (120) scenario in FIG. 1D. In both the vertical wellbore scenario and the deviated wellbore scenario, the tunnels extend from the sidewall of the wellbore longitudinally toward the opposite direction of the wellhead and laterally away from the wellbore. As a result, the spaces created by the tunnels are external to the wellbore for the robots to park, recharge, and perform data communications.

Figure 2:
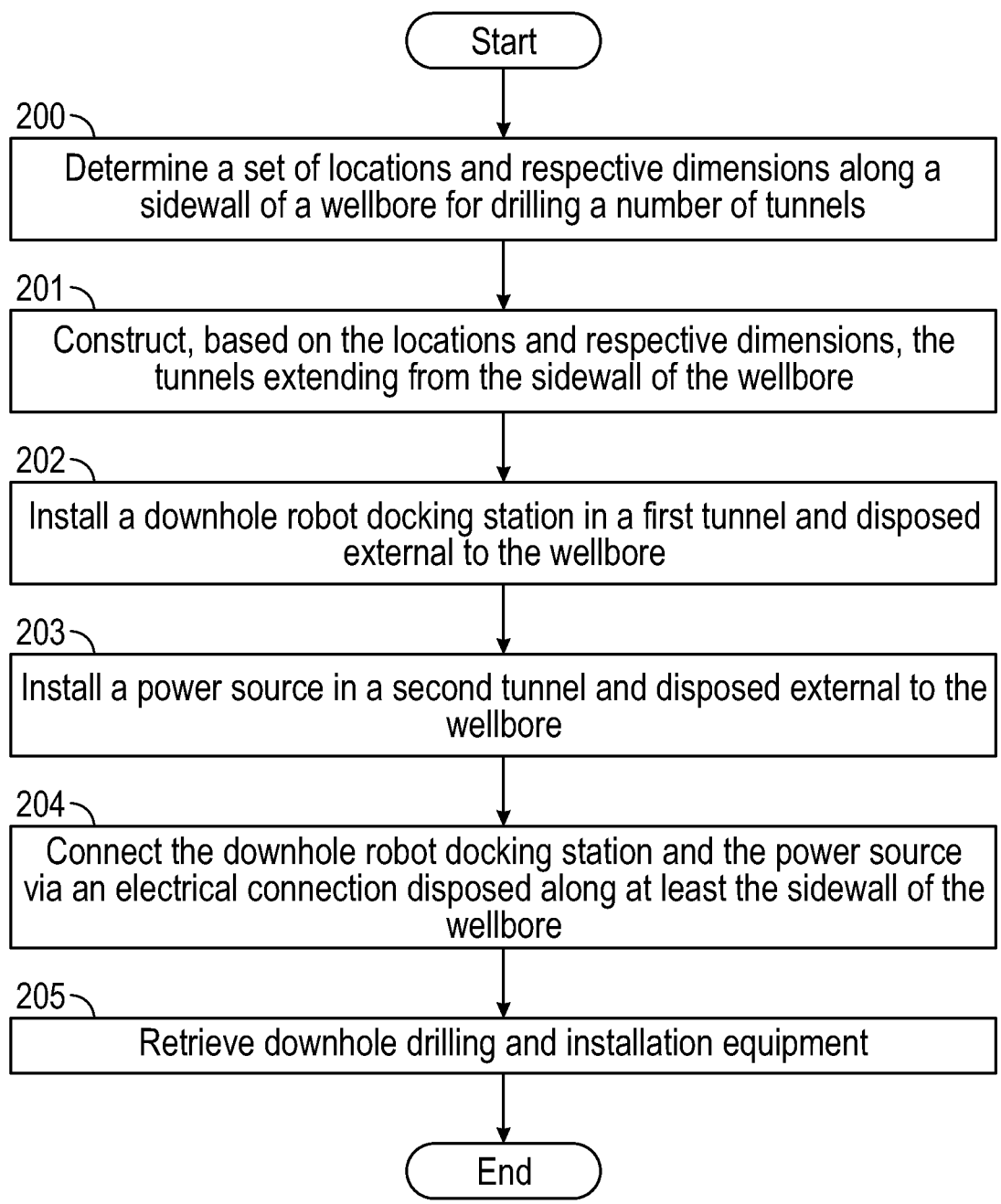
FIG. 2 shows a flowchart in accordance with one or more embodiments.

FIG. 2 shows a flowchart in accordance with one or more embodiments. One or more blocks in FIG. 2 may be performed using one or more components as described in FIGS. 1A-1B. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 200, a set of locations and respective dimensions along a sidewall of a wellbore are determined for drilling a number of tunnels. The locations and dimensions are determined based on a design of downhole robot docking stations, rechargeable batteries and energy requirements, and locate suitable depth for the downhole energy harvesting systems. The design includes the hole size, length, starting depth, smart docking features and battery types based on the downhole robots applications. In one or more embodiments, the tunnels are drilled during initial construction of the wellbore. In other embodiments, the tunnels are drilled in an existing production wellbore.

In Block 201, based on the set of locations and respective dimensions, the tunnels are constructed extending from the sidewall of the wellbore into the formation away from the wellbore. The tunnels are constructed using a mechanical radial drilling equipment. The drilled tunnels along the sidewall of the wellbore form a sequence where each pair of consecutive tunnels are within a pre-determined distance such that any downhole robot roving in the wellbore is always within the pre-determined distance from at least one tunnel. For example, one or more downhole robots may be deployed to perform a pre-determined task (e.g., maintenance task, inspection task, etc.) in the wellbore. Multiple tunnels may be drilled to extend from the same depth of the wellbore and toward different directions.

In Block 202, a downhole robot docking station is installed in a first tunnel or a compartment of the first tunnel. Because the tunnel extends away from the sidewall of the wellbore into adjacent formation, the downhole robot docking station is disposed external to the wellbore. In one or more embodiments, multiple downhole robot docking stations are distributed at different depths depending on the number of stations needed. The installed downhole robot docking stations form a sequence where each pair of consecutive downhole robot docking stations are within a pre-determined distance such that any downhole robot roving in the wellbore is always within the pre-determined distance from at least one downhole robot docking station.

In Block 203, a power source is installed in a second tunnel. Because the tunnel extends away from the sidewall of the wellbore into adjacent formation, like the downhole robot docking station, the power source is also disposed external to the wellbore. In one or more embodiments, multiple power sources are distributed at different depths depending on the number of power sources needed. The installed power sources form a sequence where each pair of consecutive power sources are within a pre-determined distance such that any downhole robot docking station is always within the pre-determined distance from at least one power source. In some embodiments, the power source may be installed in the first tunnel and imbedded in the docking station system if the operation to install the second tunnel is complicated.

In one or more embodiments, installing the power source includes installing a battery that is linked to the Earth surface for recharging. For example, the link may include a continuous and permeant connection. In another example, the link may be based on a wireline, an electrical line (E-line), or a coiled tubing that is deployed downhole during a recharging run to recharge the battery systems periodically. In one or more embodiments, installing the power source includes installing an energy harvesting device. For example, the battery may be linked to the energy harvesting device for recharging. Based on the design and energy requirements of the downhole robots, the batteries and energy harvesting devices are placed in the selected tunnels. Some tunnels may be installed with only docking stations without any power sources, other tunnels may be installed with only power sources without any docking stations, still other tunnels may be installed with a combination of two or more of docking station(s), batteries, and energy harvesting device(s).

In Block 204, the downhole robot docking station and the power source are connected via an electrical connection disposed along at least the sidewall of the wellbore. Once connected, the downhole robot docking stations are operational to be utilized by the downhole robot(s) roving in the wellbore.

In Block 205, the radial drilling equipment and additional equipment used to install the downhole robot docking stations, batteries, energy harvesting devices, and electrical connections are retrieved from the tunnels and the wellbore. For example, the equipment may circulate out with clean brine while being pulling out of the wellbore. The tunnels may be re-entered for downhole robot docking station maintenance, battery maintenance and recharge and other downhole services.

FIGS. 3A and 3B show an example in accordance with one or more embodiments. FIG. 3A shows a swarm of downhole robots (310) in a loosely coupled configuration. For example, the robot (310a) and other robots cooperatively perform a wellbore maintenance task while moving independently through the wellbore. FIG. 3B shows a swarm of downhole robots (320) in a tightly coupled configuration. For example, the robot (320a) is joining other robots to cooperatively perform a wellbore maintenance task while moving in unison through the wellbore. FIG. 3B shows an example charging configuration where the robot (330a) is installed with a wireless charger receiver (330a) that receives wireless power transmitted from a nearby charging pad (330c). For example, the charging pad (330c) may be part of the charging device (140b) depicted in FIG. 1C above.

Embodiments provide the following advantages: (i) freeing the downhole space by parking downhole robots inside the external tunnels when the robots complete their missions, (ii) mitigate downhole space limitation and fluid flow path restrictions due to robots roving in wellbore, (iii) providing prolong power for downhole robots to function for long time, and (iv) eliminating cost of repeated well intervention for downhole completion activation, monitoring or inspection. In other words, parking robots in the compartments/tunnels created specifically as homes for the robots, frees the access to main wellbore and hydrocarbon flow passage. Further, embodiments disclosed herein are applicable in vertical well sections, horizontal well sections, for smart wells monitoring, downhole completion automation, continuous downhole power generation, and downhole energy harvesting.

While the disclosure has been described with respect to a limited number of embodiments, those skilled in the art, having benefit of this disclosure, will appreciate that other embodiments may be devised which do not depart from the scope of the disclosure as disclosed herein. Accordingly, the scope of the disclosure should be limited only by the attached claims.

What is claimed is:

1. A method for constructing docking stations for downhole robots, comprising:
   determining a plurality of locations and respective dimensions along a sidewall of a wellbore for drilling a plurality of tunnels;
   constructing, based on the plurality of locations and respective dimensions, the plurality of tunnels extending from the sidewall of the wellbore;
   installing a downhole robot docking station in a first tunnel of the plurality of tunnels, wherein the downhole robot docking station is disposed external to the wellbore;
   installing a power source in a second tunnel of the plurality of tunnels, wherein the power source is disposed external to the wellbore; and
   connecting the downhole robot docking station and the power source via an electrical connection disposed along at least the sidewall of the wellbore.

2. The method of claim 1, installing the power source comprising:
   installing a battery in the second tunnel; and
   linking the battery to the Earth surface or a downhole energy harvesting device for recharging.

3. The method of claim 2,
   wherein the battery is linked to the Earth surface via a wireline or an E-line.

4. The method of claim 2, installing the power source further comprising:
   installing the energy harvesting device in one of the plurality of tunnels.

5. The method of claim 1,
   wherein the plurality of tunnels are constructed using a mechanical radial drilling technique.

6. The method of claim 1,
   wherein at least two of the plurality of tunnels extends from the sidewall of the wellbore at a same depth toward two different directions.

7. The method of claim 1, further comprising:
   deploying a plurality of downhole robots to perform a pre-determined task in the wellbore,
   wherein the downhole robot docking station is among a plurality of downhole robot docking stations installed in the plurality of tunnels,
   wherein any two of the plurality of downhole robot docking stations are separate by less than a pre-determined distance,
   wherein the plurality of downhole robot docking stations are configured to provide parking, charging, and data communication for the one or more downhole robots, and
   wherein any downhole robot roving in the wellbore is within the pre-determined distance from at least one of the plurality of downhole robot docking station.

8. A wellbore, comprising:
   a plurality of tunnels extending from a sidewall of the wellbore;
   a downhole robot docking station installed in a first tunnel of the plurality of tunnels, wherein the downhole robot docking station is disposed external to the wellbore;
   a power source installed in a second tunnel of the plurality of tunnels, wherein the power source is disposed external to the wellbore; and
   an electrical connection disposed along at least the sidewall of the wellbore that connects the downhole robot docking station and the power source.

9. The intelligent wellbore of claim 8, the power source comprising:
   a battery linked to the Earth surface or a downhole energy harvesting device for recharging.

10. The intelligent wellbore of claim 9,
    wherein the battery is linked to the Earth surface via a wireline or an E-line.

11. The intelligent wellbore of claim 9, the power source further comprising:
    the energy harvesting device installed in one of the plurality of tunnels.

12. The intelligent wellbore of claim 8,
    wherein the plurality of tunnels are constructed using a mechanical radial drilling technique.

13. The intelligent wellbore of claim 8,
    wherein at least two of the plurality of tunnels extends from the sidewall of the wellbore at a same depth toward two different directions.

14. The intelligent wellbore of claim 8,
    wherein the downhole robot docking station is among a plurality of downhole robot docking stations installed in the plurality of tunnels,
    wherein any two of the plurality of downhole robot docking stations are separate by less than a pre-determined distance,
    wherein one or more downhole robots are deployed in the wellbore to perform a pre-determined task,
    wherein the plurality of downhole robot docking stations are configured to provide parking, charging, and data communication for the one or more downhole robots, and
    wherein any downhole robot roving in the wellbore is within the pre-determined distance from at least one of the plurality of downhole robot docking station.

15. A system, comprising:
    a wellbore;
    one or more downhole robots deployed in the wellbore to perform a pre-determined task;
    a plurality of tunnels extending from a sidewall of the wellbore;
    a downhole robot docking station installed in a first tunnel of the plurality of tunnels, wherein the downhole robot docking station is disposed external to the wellbore;
    a power source installed in a second tunnel of the plurality of tunnels, wherein the power source is disposed external to the wellbore; and
    an electrical connection disposed along at least the sidewall of the wellbore that connects the downhole robot docking station and the power source,
    wherein the downhole robot docking station is configured to provide parking, charging, and data communication for the one or more downhole robots.

16. The system of claim 15, the power source comprising:
    a battery linked to the Earth surface or a downhole energy harvesting device for recharging.

17. The system of claim 16,
    wherein the battery is linked to the Earth surface via a wireline or an E-line.

18. The system of claim 16, the power source further comprising:
    the energy harvesting device installed in one of the plurality of tunnels.

19. The system of claim 15,
    wherein the plurality of tunnels are constructed using a mechanical radial drilling technique, and wherein at least two of the plurality of tunnels extends from the sidewall of the wellbore at a same depth toward two different directions.

20. The system of claim 15,
wherein the downhole robot docking station is among a plurality of downhole robot docking stations installed in the plurality of tunnels,
wherein any two of the plurality of downhole robot docking stations are separate by less than a pre-determined distance, and
wherein any downhole robot roving in the wellbore is within the pre-determined distance from at least one of the plurality of downhole robot docking station.

\* \* \* \* \*